United States Patent
Solanki et al.

(10) Patent No.: US 12,189,401 B2
(45) Date of Patent: Jan. 7, 2025

(54) AUTONOMOUS MOBILE VEHICLE

(71) Applicant: TE CONNECTIVITY SERVICES GmbH, Schaffhausen (CH)

(72) Inventors: Swapnilsinh Solanki, Harrisburg, PA (US); Kyle Mongold, Millersburg, PA (US); Anthony L. Swann, Elizabethtown, PA (US); Xinping Deng, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 555 days.

(21) Appl. No.: 16/658,876

(22) Filed: Oct. 21, 2019

(65) Prior Publication Data

US 2021/0116939 A1   Apr. 22, 2021

(51) Int. Cl.
| | |
|---|---|
| G05D 1/00 | (2024.01) |
| B25J 5/00 | (2006.01) |
| B25J 9/16 | (2006.01) |
| B60L 15/20 | (2006.01) |
| B60L 50/60 | (2019.01) |
| B60L 53/22 | (2019.01) |

(52) U.S. Cl.
CPC ............ *G05D 1/0297* (2013.01); *B25J 5/007* (2013.01); *B25J 9/162* (2013.01); *B60L 15/20* (2013.01); *B60L 50/66* (2019.02); *B60L 53/22* (2019.02)

(58) Field of Classification Search
CPC .... B25J 5/007; B25J 9/162; G05D 2201/0216
See application file for complete search history.

(56) References Cited

U.S. PATENT DOCUMENTS

| | | | |
|---|---|---|---|
| 4,781,514 A | 11/1988 | Schneider | |
| 5,281,901 A | 1/1994 | Yardley et al. | |
| 5,610,815 A | 3/1997 | Gudat et al. | |
| 5,658,120 A | 8/1997 | Watanabe | |
| 6,058,339 A | 5/2000 | Takiguchi et al. | |
| 6,654,647 B1 | 11/2003 | Kal | |

(Continued)

FOREIGN PATENT DOCUMENTS

| | | |
|---|---|---|
| CN | 203497627 U | 3/2014 |
| CN | 105174135 A | 12/2015 |

(Continued)

*Primary Examiner* — Stephen Holwerda
*Assistant Examiner* — Aaron G Cain (57) ABSTRACT

An autonomous mobile vehicle includes an AGV having a base, a motor coupled to the base, a wheel driven by the motor for moving the AGV, a battery coupled to the motor to power the motor, and an AGV controller for controlling movement of the AGV. The autonomous mobile vehicle includes a platform assembly coupled to the base. The platform assembly includes a frame defining a cavity and a support plate supported by the frame configured to support a collaborative manipulator. The platform assembly includes a collaborative manipulator controller received in the cavity configured to be operably coupled to the collaborative manipulator to actuate the collaborative manipulator in accordance with a control scheme. The platform assembly includes a safety controller received in the cavity electrically coupled to the battery of the AGV to control a power supply to the collaborative manipulator controller.

23 Claims, 4 Drawing Sheets

(56) References Cited

U.S. PATENT DOCUMENTS

| | | | |
|---|---|---|---|
| 6,904,343 B2 | 6/2005 | Kang | |
| 6,950,311 B1* | 9/2005 | DeCesare | H04Q 1/023 |
| | | | 361/728 |
| 7,854,108 B2 | 12/2010 | Koselka et al. | |
| 7,890,228 B2 | 2/2011 | Redmann, Jr. et al. | |
| 8,594,834 B1 | 11/2013 | Clark et al. | |
| 9,200,912 B2 | 12/2015 | Lee | |
| 9,519,882 B2 | 12/2016 | Galluzzo et al. | |
| 9,733,646 B1 | 8/2017 | Nusser et al. | |
| 9,868,591 B2 | 1/2018 | Bae et al. | |
| 10,308,430 B1 | 6/2019 | Brady et al. | |
| 2002/0092351 A1* | 7/2002 | Horning | G11B 33/08 |
| 2006/0101547 A1* | 5/2006 | Desmond | B82Y 30/00 |
| | | | 901/6 |
| 2007/0103107 A1 | 5/2007 | Hayashi | |
| 2015/0032252 A1* | 1/2015 | Galluzzo | G05D 1/0248 |
| | | | 700/218 |
| 2016/0167557 A1 | 6/2016 | Mecklinger | |
| 2016/0368710 A1* | 12/2016 | Ramankutty | B65G 1/0421 |
| 2017/0001305 A1* | 1/2017 | Kogan | B25J 9/162 |
| 2017/0166399 A1* | 6/2017 | Stubbs | G06Q 10/087 |
| 2018/0141755 A1 | 5/2018 | Khodl et al. | |
| 2018/0208398 A1 | 7/2018 | Haveman et al. | |
| 2018/0222047 A1* | 8/2018 | Nishi | G05D 1/0088 |
| 2019/0216555 A1* | 7/2019 | DiMaio | B25J 9/1664 |
| 2019/0286138 A1* | 9/2019 | Skaaksrud | G05D 1/43 |

FOREIGN PATENT DOCUMENTS

| | | |
|---|---|---|
| CN | 105417078 A | 3/2016 |
| CN | 107364808 A | 11/2017 |
| CN | 206720664 U | 12/2017 |
| CN | 107745960 A | 3/2018 |
| CN | 107915169 A | 4/2018 |
| CN | 108147111 A | 6/2018 |
| CN | 207645315 U | 7/2018 |
| EP | 456769 A1 | 11/1991 |
| EP | 468960 B1 | 7/1994 |
| EP | 1985577 A3 | 4/2012 |
| EP | 3074338 A1 | 10/2016 |
| EP | 3246775 B1 | 12/2018 |
| JP | 11043296 A | 2/1999 |
| KR | 2014111785 A | 9/2014 |
| WO | WO2018012285 A1 | 1/2018 |

* cited by examiner

AUTONOMOUS MOBILE VEHICLE

BACKGROUND OF THE INVENTION

The subject matter herein relates generally to autonomous mobile vehicles.

AGVs (Automatic Guided Vehicles) are becoming increasingly popular in production facilities to transport parts and materials autonomously from one location to another one. Production facilities that utilize AGVs typically include a central operator station where an operator processing requests and sends the AGVs to perform the tasks. Such systems typically involve considerable human intervention in the control of the AGVs. Some know production environment have become automated, with the processing machines communicating directly with the AGVs to process requests with no human intervention in the process. However, central control of the AGVs has proven difficult to achieve. Prioritization of machine requests and efficient routing and planning of AGV automation is difficult.

During use, AGVs navigate autonomously from point-to-point and transport materials. However, conventional systems typically require manual assistance while loading and unloading the materials to and from the AGV. Some known AGVs include a collaborative manipulator, such as a robot arm, mounted on top of the AGV to manipulate materials. However, such robot arms have independent control from the control of the AGV. Mounting and integration of the robot arms with the AGV are expensive and unit specific.

A need remains for an autonomous mobile vehicle having a modular platform for use with various types of AGVs and various types of collaborative manipulators.

BRIEF DESCRIPTION OF THE INVENTION

In one embodiment, an autonomous mobile vehicle is provided including an automatic guided vehicle (AGV) having a base, a motor coupled to the base, a wheel driven by the motor for moving the AGV, a battery coupled to the motor to power the motor, and an AGV controller for controlling movement of the AGV. The autonomous mobile vehicle includes a platform assembly coupled to the base of the AGV and moves with the AGV. The platform assembly includes a frame defining a cavity. The platform assembly includes a support plate supported by the frame configured to support a collaborative manipulator, the platform assembly including a collaborative manipulator controller received in the cavity configured to be operably coupled to the collaborative manipulator to actuate the collaborative manipulator in accordance with a control scheme. The platform assembly includes a safety controller received in the cavity, the safety controller is electrically coupled to the battery of the AGV to control a power supply to the collaborative manipulator controller.

In another embodiment an autonomous mobile arm platform is provided for an automatic guided vehicle (AGV) has a base, a motor coupled to the base, a wheel driven by the motor for moving the AGV, a battery coupled to the motor to power the motor, and an AGV controller for controlling movement of the AGV. The autonomous mobile arm platform includes a frame coupled to the base of the AGV and moved with the AGV. The frame has side walls between a top and a bottom of the frame and the side walls defining a cavity. The autonomous mobile arm platform includes a support plate at the top of the frame supports the plate to support a collaborative manipulator. The autonomous mobile arm platform includes a collaborative manipulator controller received in the cavity to be operably coupled to the collaborative manipulator to actuate the collaborative manipulator in accordance with a control scheme. The autonomous mobile arm platform includes a safety controller received in the cavity electrically coupled to the battery of the AGV to control a power supply to the collaborative manipulator controller. The safety controller includes a safety relay. The safety relay is operable in a normal operation mode and in a safe operation mode the safety relay supplies the power supply to the collaborative manipulator controller when operating in the normal operation mode. The safety relay restricts the power supply from the collaborative manipulator controller when operating in a safe operation mode.

In another embodiment, an autonomous mobile vehicle is provided including an automatic guided vehicle (AGV) having a base, a motor coupled to the base, a wheel driven by the motor for moving the AGV, a battery coupled to the motor to power the motor, and an AGV controller for controlling movement of the AGV. The autonomous mobile vehicle includes a platform assembly coupled to the base of the AGV and moved with the AGV including a frame defining a cavity and having a support plate supported by the frame including a first mounting area and a second mounting area. A collaborative manipulator controller is received in the cavity being electrically coupled to the battery of the AGV. The autonomous mobile vehicle includes a collaborative manipulator configured to be mounted to the support plate at the first mounting area to orient the collaborative manipulator in a first orientation relative to the platform assembly and configured to be mounted to the support plate at the second mounting area to orient the collaborative manipulator in a second orientation relative to the platform assembly. The collaborative manipulator configured to manipulate parts and move the parts to and from the support plate.

In a further embodiment, the autonomous mobile vehicle system is provided including a first machine at a first location having first parts and a second machine at a second location has second parts. The autonomous mobile vehicle system includes a plurality of autonomous mobile vehicles are movable between the first machine and the second machine. Each autonomous mobile vehicle includes an AGV, a platform assembly mounted to the AGV, and a collaborative manipulator mounted to the platform assembly. The AGV includes a base, a motor coupled to the base, a wheel driven by the motor for moving the AGV, a battery coupled to the motor to power the motor, and an AGV controller for controlling movement of the AGV. The platform assembly is movable with the AGV and includes a frame defining a cavity and a support plate supported by the frame. The collaborative manipulator is mounted to the support plate. The platform assembly includes a collaborative manipulator controller received in the cavity operably coupled to the collaborative manipulator to actuate the collaborative manipulator in accordance with a control scheme. The platform assembly includes a safety controller received in the cavity, the safety controller being electrically coupled to the battery of the AGV to control a power supply to the collaborative manipulator controller. The autonomous mobile vehicle system includes a system control module to guide the autonomous mobile vehicles within an environment between the first machine and the second machine. The system control module includes a control communication module communicatively coupled to the first machine and the second machine, the control communication module being communicatively coupled to the autonomous mobile vehicles to guide the autonomous mobile vehicles between the first machine and the second machine. The system control module includes a human machine interface communicatively coupled to the control communication module to receive inputs from an operator.

DETAILED DESCRIPTION OF THE INVENTION

Figure 1:
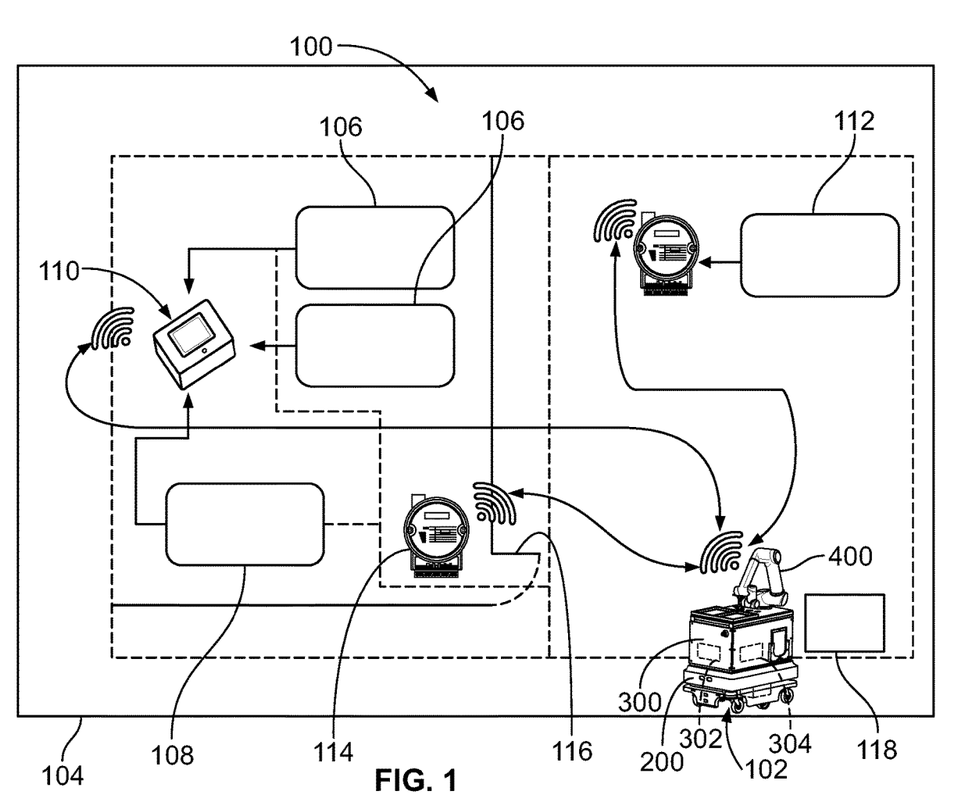
FIG. 1 is a schematic illustration of an autonomous mobile vehicle system in accordance with an exemplary embodiment.

FIG. 1 is a schematic illustration of an autonomous mobile vehicle system 100 in accordance with an exemplary embodiment. The autonomous mobile vehicle system 100 is used to control movements of mobile robots or autonomous mobile vehicles 102 within a logistics facility 104, such as a warehouse, a distribution center, and manufacturing facility, a retail facility, and the like. The autonomous mobile vehicles 102 are used for part picking and part drop-off within the logistics facility 104. For example, the autonomous mobile vehicles 102 are used to pick up parts from one or more machines 106, such as manufacturing machines, storage bins, and the like, and the autonomous mobile vehicles 102 are used to drop off parts at other machines, such as other manufacturing machines, storage bins, and the like.

In an exemplary embodiment, the autonomous mobile vehicle system 100 includes a system control module 110 located within the logistics facility 104, such as within a location or room containing one or more of the machines 106, 108. The system control module 110 is communicatively coupled to the machines 106, 108, such as by wired connections or wireless connections. The system control module 110 is communicatively coupled to a plurality of the autonomous mobile vehicles 102 to control part processing within the logistics facility 104, such as movement of the parts between the machines 106, 108 using the autonomous mobile vehicles 102. The autonomous mobile vehicles 102 transport the parts autonomously from one location to another, such as between the machines 106, 108 based on control signals received from the system control module 110.

In an exemplary embodiment, the autonomous mobile vehicle system 100 includes an operator station 112 for managing and controlling the autonomous mobile vehicle system 100. The operator station 112 is communicatively coupled to the system control module 110 to monitor and/or control operation of the system control module 110. The operator station 112 is communicatively coupled to the autonomous mobile vehicles 102 to monitor and/or control the autonomous mobile vehicles 102. For example, the operator station 112 may be wirelessly coupled to the autonomous mobile vehicles 102.

In an exemplary embodiment, the autonomous mobile vehicle system 100 includes one or more wireless devices 114 configured to be communicatively coupled to the autonomous mobile vehicles 102 and/or the system control module 110 and/or the operator station 112 and/or one or more system components 116. For example, the wireless device 114 may be coupled to a door and is used to open and close the door to allow the autonomous mobile vehicles 102 to move between locations or rooms within the logistics facility 104. The wireless devices 114 may be operably coupled to other types of system components 116 in alternative embodiments.

In an exemplary embodiment, the autonomous mobile vehicle system 100 includes docking stations 118 for the autonomous mobile vehicles 102. The docking stations 118 may be used to store and or charge the autonomous mobile vehicles 102. In an exemplary embodiment, the autonomous mobile vehicles 102 return to the docking station 118 after performing one or more tasks to recharge the autonomous mobile vehicles 102.

The autonomous mobile vehicle 102 navigates autonomously from point-to-point within the logistics facility 104, such as to pick up parts, drop off parts, inventory parts, or return to the docking station 118. For example, the autonomous mobile vehicle 102 moves along one or more paths through the logistics facility 104 between the docking station 118 and the machines 106, 108. The autonomous mobile vehicle 102 includes an automatic guided vehicle (AGV) 200, a platform assembly 300 mounted to the AGV 200, and a collaborative manipulator 400 mounted to the platform assembly 300. The AGV 200 is used to move the autonomous mobile vehicle 102 around the logistics facility 104. The collaborative manipulator 400 is used for manipulating the parts at the machines 106, 108. For example, the collaborative manipulator 400 may include a robot arm and/or a gripper and/or a conveyor in various embodiments. Other types of part manipulators may be utilized in alternative embodiments. The platform assembly 300 provides a mechanical and electrical connection between the AGV 200 and the collaborative manipulator 400. The platform assembly 300 may be modular and/or scalable for mounting to different types of AGVs 200 and/or for mounting different types of collaborative manipulators 400. The platform assembly 300 includes a collaborative manipulator controller 302 for the collaborative manipulator 400. The platform assembly 300 includes a safety controller 304 for controlling operation of the AGV 200 and the collaborative manipulator 400 in accordance with a safety protocol to ensure safe operation of the collaborative manipulator 400.

Figure 2:
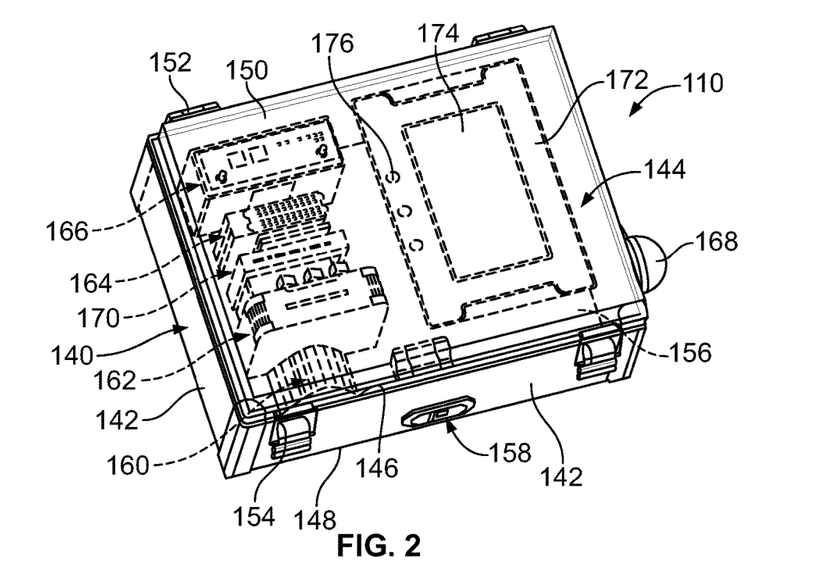
FIG. 2 is a top perspective view of a system control module in accordance with an exemplary embodiment.

FIG. 2 is a top perspective view of the system control module 110 in accordance with an exemplary embodiment. The system control module 110 includes a frame 140 holding a plurality of system components. The frame 140 includes a plurality of walls 142 forming a cavity 144. The frame 140 includes a top 146 and a bottom 148. Optionally, the frame 140 may include a lid or cover 150 at the top 146 coupled to the walls 142 using hinges 152 and latches 154.

The system control module 110 includes a substrate 156 at the bottom 148. The system components are mounted to the substrate 156. Optionally, the substrate 156 may be a printed circuit board. In other various embodiments, the substrate 156 may be a metal panel. In an exemplary embodiment, the system control module 110 includes a connector 158 at one of the walls 142 mounted to the substrate 156. The connector 158 provides access between the cavity 144 and the exterior of the system control module 110. The connector 158 may be a power connector and/or a data communication connector.

In an exemplary embodiment, the system control module 110 includes terminal blocks 160 mounted to the substrate 156. Power wires and/or data communication wires may be terminated to the terminal blocks 160. For example, the power wires and/or the data communication wires may extend through the bottom 148 and/or one or more of the walls 142 for termination to the terminal blocks 160. The terminal blocks 160 are used for organizing the wires within the cavity 144.

The system control module 110 includes a power supply 162 coupled to the terminal block 160 and/or the substrate 156. The power supply 162 is used to power other system components of the system control module 110. In various embodiments, the power supply 162 may be coupled to a power rail, such as a DIN rail, and other components of the system control module 110 may be coupled to the power rail.

The system control module 110 includes one or more I/O modules 164 mounted to the terminal block 160 and/or the substrate 156. The I/O modules 164 are electrically connected to other components of the autonomous mobile vehicle system 100, such as the machines 106, 108 (shown in FIG. 1), using plug connectors or hardwiring between the I/O module 164 and the machines 106, 108. In other various embodiments, the system control module 110 may communicate with the machines 106, 108 by wireless data communication rather than being hardwired.

The system control module 110 includes a communication module 166 mounted to the terminal block 160 and/or the substrate 156. The communication module 166 is configured to communicate wirelessly with other components of the autonomous mobile vehicle system 100, such as the autonomous mobile vehicles 102 (shown in FIG. 1) and/or the system control module 110 (shown in FIG. 1). The communication module 166 is capable of transmitting and receiving signals. In an exemplary embodiment, the communication module 166 is electrically connected to an antenna 168, such as an omnidirectional antenna mounted to one of the walls 142. The communication module 166 is configured to communicate via one or more wireless networking protocols, such as a Wi-Fi communication protocol. The communication module 166 may use other wireless forms of communication, such as cellular data communication. In various embodiments, the communication module 166 communicates with the autonomous mobile vehicles 102 and other components within the system 100 via a Modbus TCP protocol; however, the communication module 166 may communicate by other communication protocols in alternative embodiments.

In an exemplary embodiment, the system control module 110 includes a system controller 170 for processing the control scheme for the autonomous mobile vehicle system 100. The system controller 170 receives inputs from the operator station 112, the machines 106, 108, the docking stations 118 and the autonomous mobile vehicles 102 and generates outputs to the operator station 112, the machines 106, 108, the docking stations 118 and the autonomous mobile vehicles 102. The system controller 170 guides the autonomous mobile vehicles 102 between the various machines 106, 108 and the docking stations 118 within the autonomous mobile vehicle system 100. For example, the system controller 170 may receive inputs from the machines 106, 108 requesting part pickup or part delivery. The system controller 170 determines which autonomous mobile vehicle 102 is to perform the various tasks and provides guidance and/or route planning for the autonomous mobile vehicles 102 within the logistics facility 104 to pickup the parts and/or drop off the parts in accordance with the control scheme. The inputs and outputs are received and/or transmitted via the I/O modules 164 and/or the communication module 166.

The system controller 170 includes electronic components, such as a processor, a memory, and the like for data processing and control of the components of the autonomous mobile vehicle system 100. In an exemplary embodiment, the system controller 170 includes logic software that receives inputs, prioritizes requests from the machines 106, 108, sends control signals to the autonomous mobile vehicles 102, receives location and task information from the autonomous mobile vehicles 102, prioritizes control functions of the autonomous mobile vehicles 102, sends acknowledgment signals to the machines 106, 108 and/or the autonomous mobile vehicles 102, and the like. The system controller 170 may continuously monitor incoming requests from the machines 106, 108. The system controller 170 sends pickup and delivery requests to the autonomous mobile vehicles 102 based on priorities assigned to the machines 106, 108. The system controller 170 sends acknowledgment signals to the machines 106, 108 upon completion of the pickup and drop-off tasks by the autonomous mobile vehicles 102.

In an exemplary embodiment, the system control module 110 includes a human machine interface (HMI) 172 communicatively coupled to the system controller 170 and/or the communication module 166. The HMI 172 may provide a log or status of inputs and outputs to and from the system control module 110 for the user to review. The HMI 172 receives inputs from an operator of the system control module 110. The HMI 172 includes a display 174 and inputs 176. For example, the inputs 176 may be buttons, dials, a keypad, a keyboard, and the like. Optionally, the display 174 may be a touchscreen having digital inputs on the display 174. In an exemplary embodiment, the HMI 172 is a remote control device removable from the system control module 110. For example, the HMI 172 may be removably mounted to the frame 140 and/or the cover 150. In various embodiments, the user may connect to and/or monitor one or more of the autonomous mobile vehicles 102 via the HMI 172. The user may remotely control the autonomous mobile vehicles 102 through the HMI 172.

Figure 3:
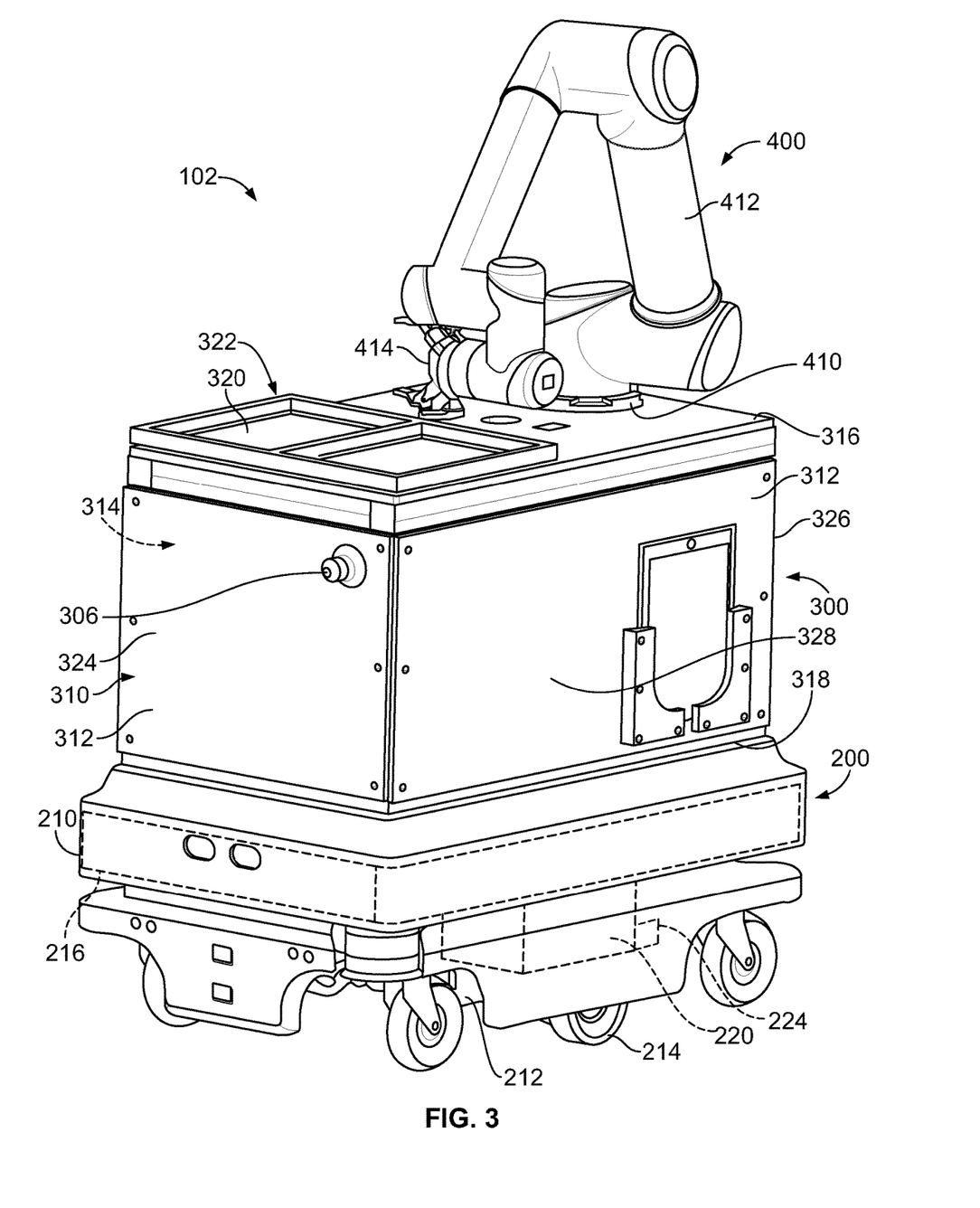
FIG. 3 is a front perspective view of an autonomous mobile vehicle in accordance with an exemplary embodiment.

FIG. 3 is a front perspective view of the autonomous mobile vehicle 102 in accordance with an exemplary embodiment. FIG. 3 illustrates the platform assembly 300 mounted to the AGV 200 and illustrates the collaborative manipulator 400 mounted to the platform assembly 300.

The AGV 200 includes a base 210 housing a motor 212 and wheels 214 driven by the motor 212 from moving the AGV 200. The AGV 200 includes a battery 216 coupled to the motor 212 to power the motor 212. In an exemplary embodiment, the AGV 200 includes an AGV controller 224 controlling movement of the AGV 200. The AGV controller 220 is operably coupled to the motor 212. The AGV controller 220 controls operation of the motor 212 to move the AGV 200. The AGV controller 220 is communicatively coupled to the system control module 110 (shown in FIG. 1) to receive control signals for operating the AGV 200. For example, the AGV controller 220 may receive route information to guide the AGV 200 along a particular path, such as between the docking station 118 and the machines 106, 108 (shown in FIG. 1). The AGV controller 220 may receive information instructing the AGV 200 to stop, to move forward, to move rearward, and/or to turn right or left for controlling movement of the AGV 200.

The platform assembly 300 includes a frame 310 having walls 312 enclosing a cavity 314. The walls 312 extend between a top 316 and a bottom 318 of the frame 310. The bottom 318 of the frame 310 is mounted to the base 210 of the AGV 200. The platform assembly 300 is moved with the AGV 200. In an exemplary embodiment, the platform assembly 300 includes an emergency stop button 306 on one of the walls 312 that may be used to stop operation of the AGV 200 and/or the collaborative manipulator 400. Optionally, one or more of the walls 312 may include vents for air circulation through the cavity 314.

The platform assembly 300 includes a support plate 320 at the top 316. The support plate 320 supports the collaborative manipulator 400. For example, the collaborative manipulator 400 may be mounted directly to the support plate 320, such as using fasteners. In an exemplary embodiment, the support plate 320 includes a plurality of mounting locations for mounting the collaborative manipulator 400 at different locations on the support plate 320 and/or for mounting different types of collaborative manipulators on the support plate 320. For example, the support plate 320 may include different mounting hole patterns and wire holes for the control and power wires of the collaborative manipulator 400 at the different mounting locations for receiving different types of collaborative manipulators 400. The mounting locations may be arranged relative to other components of the platform assembly 300, such as the controller, wiring, or other components. In various embodiments, the other components may be variably positionable within the frame 310 to align with the selected mounting location of the collaborative manipulator 400. The mounting locations are on the same surface of the support plate 320 at different areas. The mounting locations may be uniformly spaced along the support plate 320. For example, the holes may be in a uniform pattern. In other various embodiments, the mounting locations may be non-uniformly spaced. For example, the holes may be non-uniformly spaced. In alternative embodiments, a mounting bracket (not shown) may be provided at the support plate 320. The mounting bracket may be slidable or movable along the support plate 320 to vary a mounting location of the collaborative manipulator 400 relative to the support plate 320. In an exemplary embodiment, the platform assembly 300 includes a part holder 322 at the top of the support plate 320. The part holder 322 may include rails or walls forming a space to receive and retain the parts on the support plate 320 during transport, such as between the machines 106, 108. In the illustrated embodiment, the part holder 322 is located proximate to a front 324 of the platform assembly 300. However, the part holder 322 may be located at other locations, such as proximate to a rear 326 of the platform assembly 300 and or the sides 328 of the platform assembly 300. The part holder 322 may be mountable to the support plate 320 using the same hole pattern for mounting the collaborative manipulator 400 such that the mounting locations may be used for mounting either of the part holder 322 or the collaborative manipulator 400.

In an exemplary embodiment, the collaborative manipulator 400 includes a mounting base 410 that is mounted to the support plate 320, such as using fasteners. In the illustrated embodiment, the collaborative manipulator 400 is mounted proximate to the rear 326 of the platform assembly 300. Other mounting locations are possible in alternative embodiments. The mounting base 410 fixes the collaborative manipulator 400 relative to the platform assembly 300.

In an exemplary embodiment, the collaborative manipulator 400 includes an arm 412 and a gripper 414 at an end of the arm 412 used for picking up the parts and moving the parts to or from the part holder 322. The arm 412 may be a four-axis manipulating arm or a six-axis manipulating arm in various embodiments. Other types of robot arms may be used in alternative embodiments. In other various embodiments, other types of part manipulators may be utilized rather than the gripper 414 and/or the arm 412. For example, the collaborative manipulator 400 may include a conveyor, a stack light, or other type of manipulator.

Figure 4:
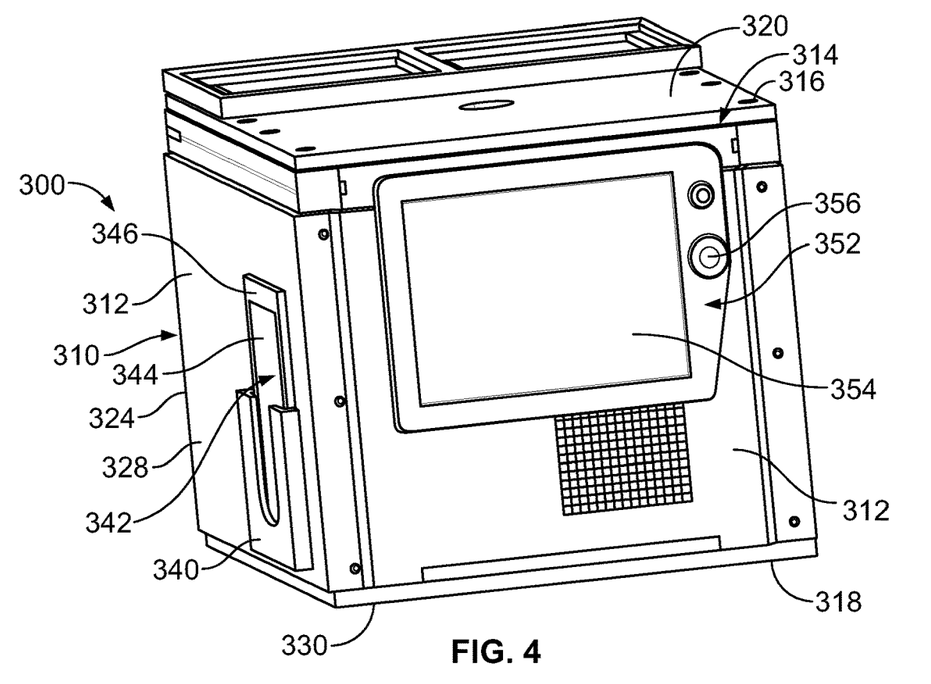
FIG. 4 is a front perspective view of a platform assembly of the autonomous mobile vehicle in accordance with an exemplary embodiment.

FIG. 4 is a rear perspective view of the platform assembly 300 in accordance with an exemplary embodiment. The walls 312 extend between the top 316 and the bottom 318. The support plate 320 is provided at the top 316. A base wall 330 is provided at the bottom 318. In the illustrated embodiment, the frame 310 is box shaped. The frame 310 may have other shapes in alternative embodiments.

In an exemplary embodiment, the platform assembly 300 includes a remote control device mounting bracket 340 along one of the sides 328 that receives a remote control device 342 therein. The remote control device 342 is removably received in the remote control device mounting bracket 340. The remote control device 342 defines a human machine interface for the platform assembly 300, such as for controlling the AGV 200 and/or the collaborative manipulator 400 (both shown in FIG. 3). The remote control device 342 is communicatively coupled to the AGV controller 220 (shown in FIG. 3), and/or the collaborative manipulator controller 302 (shown in FIG. 5), and/or the safety controller 304 (shown in FIG. 5). The remote control device 342 receives inputs from an operator to monitor and/or control the autonomous mobile vehicle 102. In an exemplary embodiment, the remote control device 342 is communicatively coupled to the system control module 110 and/or the operator station 112 (both shown in FIG. 1) for remote monitoring and/or control of the autonomous mobile vehicle 102 through the remote control device 342. In an exemplary embodiment, the remote control device 342 includes a display 344 and inputs 346 four directly receiving inputs from the operator. For example, the inputs 346 may be buttons, dials, a keypad, a keyboard, and the like. Optionally, the display 344 may be a touchscreen having digital inputs on the display 344. In various embodiments, the remote control device 342 may be a tablet.

In an exemplary embodiment, the platform assembly 300 includes a mounting structure, such as a mounting bracket, along the front 324 that receives a teach pendant 352. Optionally, the teach pendant 352 may be electrically connected to the collaborative manipulator controller 302, such as via one or more wires passing through the wall 312 the frame 310 into the cavity 314. Alternatively, the teach pendant 352 may be wirelessly connected to the collaborative manipulator controller 302. The teach pendant 352 may be removably coupled to the mounting structure. The teach pendant 352 defines a human machine interface for the collaborative manipulator 400 (shown in FIG. 3). The teach pendant 352 may be used for programming the motions of the collaborative manipulator 400, such as in a teach mode. In an exemplary embodiment, the teach pendant 352 includes a display 354 and inputs 356. For example, the inputs 356 may be buttons, dials, a keypad, a keyboard, and the like. Optionally, the display 354 may be a touchscreen having digital inputs on the display 354.

Figure 5:
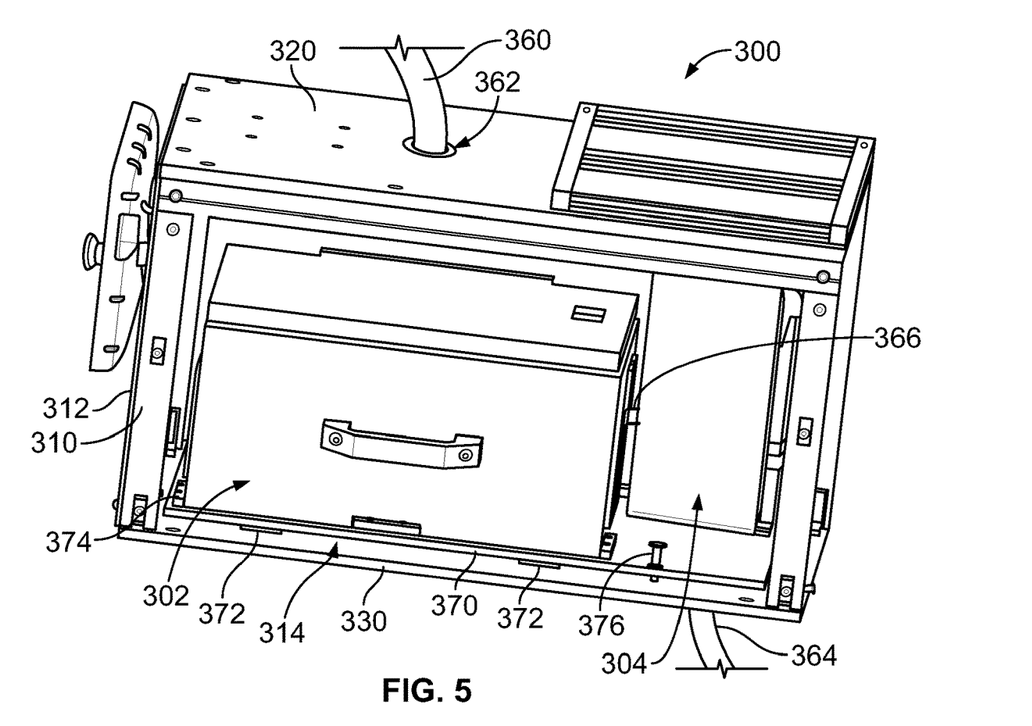
FIG. 5 is a side perspective view of a portion of the platform assembly in accordance with an exemplary embodiment.

FIG. 5 is a side perspective view of a portion of the platform assembly 300 with one of the walls 312 removed to illustrate the components of the platform assembly 300 within the cavity 314. FIG. 5 illustrates the collaborative manipulator controller 302 and the safety controller 304 within the cavity 314. The safety controller 304 is electrically connected between the collaborative manipulator controller 302 and the AGV 200 (shown in FIG. 3). The safety controller 304 controls the power supply between the AGV 200 and the collaborative manipulator 400, such as providing circuit protection between the battery 216 and the collaborative manipulator 400.

In an exemplary embodiment, the platform assembly 300 includes wires 360 extending from the collaborative manipulator controller 302 through an opening 362 in the support plate 320. The wires 360 are configured to be connected to the collaborative manipulator 400. The wires 360 supply power and control signals between the collaborative manipulator controller 302 and the collaborative manipulator 400.

In an exemplary embodiment, the platform assembly 300 includes wires 364 extending from the safety controller 304 through the base wall 330. The wires 364 are configured to be connected to the AGV 200 (shown in FIG. 3), such as to the battery 216 of the AGV 200. The wires 364 supply power to the platform assembly 300. The safety controller 304 controls the power supply to other components, such as the collaborative manipulator controller 302 and the collaborative manipulator 400. For example, wires 366 used to supply power to the collaborative manipulator controller 302 extend between the collaborative manipulator controller 302 and the safety controller 304.

In an exemplary embodiment, the platform assembly 300 includes a tray 370 slidably coupled to the frame 310. For example, slide rails 372 may be mounted to the base wall 330 to allow the tray 370 be pulled out of the cavity 314, such as to access the collaborative manipulator controller 302 and/or the safety controller 304. The tray 370 includes mounting blocks 374 for mounting the collaborative manipulator controller 302 and the safety controller 304 on the tray 370. The collaborative manipulator controller 302 and the safety controller 304 are slidable into and out of the cavity 314 with the tray 370. The tray 370 provides easy access to the collaborative manipulator controller 302 and the safety controller 304 during assembly or repair of the platform assembly 300. In an exemplary embodiment, the tray 370 includes a lock 376 for locking the tray 370 relative to the frame 310. For example, the lock 376 may be a locking bolt or other type of lock.

Figure 6:
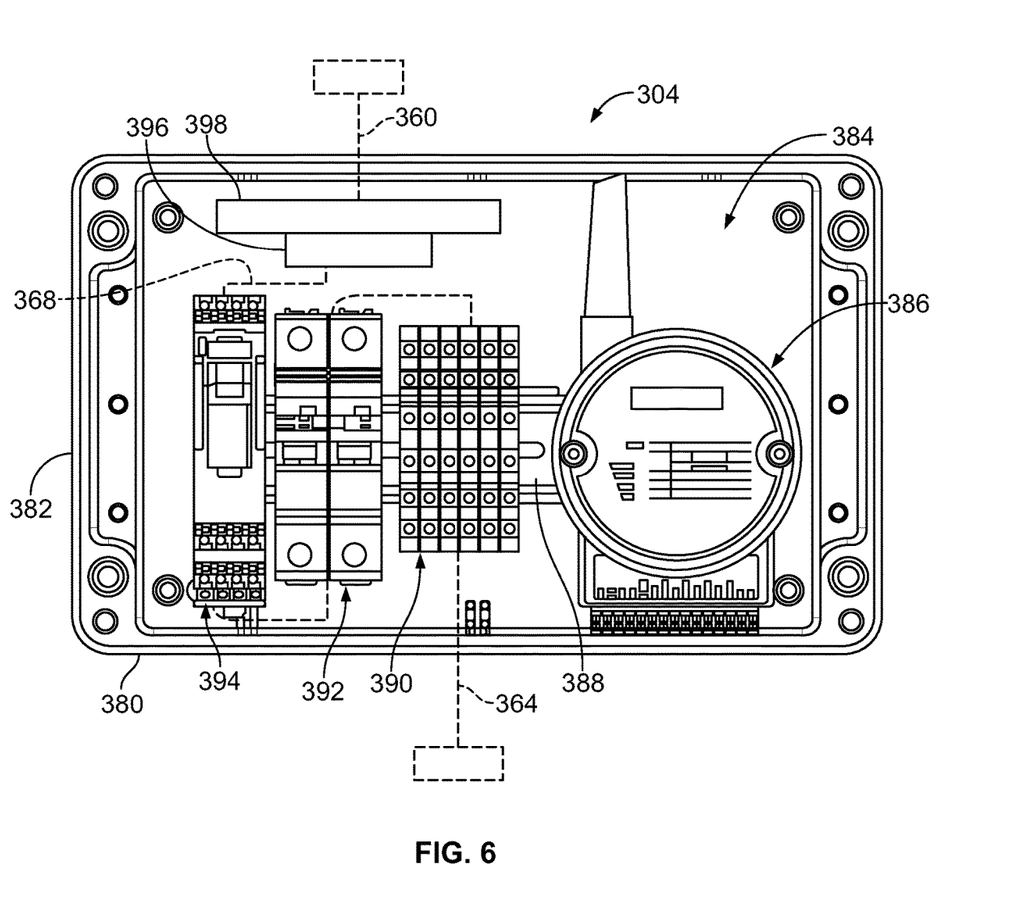
FIG. 6 illustrates the safety controller in accordance with an exemplary embodiment.

FIG. 6 illustrates the safety controller 304 in accordance with an exemplary embodiment. The safety controller 304 includes a safety controller box 380 holding a plurality of safety components. The safety controller box 380 includes a plurality of walls 382 forming a chamber 384. The safety controller box 380 may include a lid or cover (not shown) coupled to the walls 382 to provide access to the chamber 384. In an exemplary embodiment, the safety controller 304 includes a power rail 388, such as a DIN rail, to electrically connect various components of the safety controller 304.

The safety controller 304 includes a communication module 386 within the chamber 384. The communication module 386 is configured to communicate wirelessly with other components of the autonomous mobile vehicle system 100, such as the communication module 166 (shown in FIG. 1) of the system control module 110 (shown in FIG. 1) and/or the operator station 112 (shown in FIG. 1). In an exemplary embodiment, the communication module 386 includes an antenna, such as an omnidirectional antenna. The communication module 386 is configured to communicate via one or more wireless networking protocols, such as a Wi-Fi communication protocol. The communication module 386 may use other wireless forms of communication, such as cellular data communication. In various embodiments, the communication module 386 may receive a stop signal or other type of safety signal instructing the autonomous mobile vehicle 102 to stop or to operate in a safe mode.

In an exemplary embodiment, the safety controller 304 includes a terminal block 390 mounted to the power rail 388 along one of the walls 382 of the safety controller box 380. The wires 364 are terminated to the terminal block 390. For example, the wires 364 supply power to the safety controller 304, such as from the battery 216 of the AGV 200 (shown in FIG. 3). The power supply wires may extend through one of the walls 382 of the safety controller box 380 for termination to the terminal block 390.

The safety controller 304 includes a circuit breaker 392 coupled to the terminal block 390. The circuit breaker 392 prevents damage caused by excess current from an overload or short-circuit. The circuit breaker 392 interrupt current flow of the power supply after a fault is detected.

The safety controller 304 includes a safety relay 394 coupled to the terminal block 390 and/or the circuit breaker 392. The wires 360 are electrically connected to the safety relay 394 and extend to the collaborative manipulator controller 302 (shown in FIG. 5). The safety relay 394 controls the power supply to the collaborative manipulator controller 302 through the wires 360. For example, the safety relay 394 is operable in a normal operation mode to allow the power supply to the collaborative manipulator controller 302. The safety relay 394 is operable in a safe operation mode to restrict the power supply from the collaborative manipulator controller 302. In various embodiments, the safety relay 394 is open in the safe operation mode to restrict the power supply and closed in the normal operation mode to allow the power supply to the collaborative manipulator controller 302.

In an exemplary embodiment, the communication module 386 is coupled to the safety relay 394. Control signals received at the communication module 386 are used to control the safety relay 394, such as to open and close the safety relay 394. For example, the communication module 386 may receive a control signal requesting shut down of the collaborative manipulator 400 and/or the AGV 200. The communication module 386 causes the safety relay to operate in the safe operation mode to open the safety relay 394 and restrict power supply to the collaborative manipulator 400 and/or the AGV 200.

The safety controller 304 includes one or more power converters to control the voltage of the power supply. In an exemplary embodiment, the safety controller 304 includes multiple power converters to provide different output voltages. For example, the safety controller 304 includes a first power converter 396 and a second power converter 398. The power converters 396, 398 may be DC-DC power converters to convert from the voltage level of the battery 216 to a desired voltage level. The first power converter 396 supplies the power supply at a first voltage and the second power converter 398 supplies the power supply at a second voltage different than the first voltage. The first power converter 396 is configured to be electrically connected to one or more components of the collaborative manipulator 400 and the second power converter 398 is configured to be electrically connected to one or more different components of the collaborative manipulator 400. In an exemplary embodiment, the wires 360 are coupled to the power converters 396, 398 and extend from the safety controller 304 to the collaborative manipulator controller 302. Wires 368 extend between the power converters 396, 398 and the safety relay 394. The safety relay 394 is configured to allow and restrict the power supply to the power converters 396, 398 when the safety relay 394 is closed or open, respectively.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. An autonomous mobile vehicle comprising:
   an automatic guided vehicle (AGV) having a base, a motor coupled to the base, a wheel driven by the motor for moving the AGV, a battery coupled to the motor to power the motor, and an AGV controller for controlling movement of the AGV; and
   a platform assembly coupled to the base of the AGV and moved with the AGV, the platform assembly including a frame having walls enclosing and defining a cavity, the platform assembly including a support plate supported by the frame configured to support a collaborative manipulator, the platform assembly including a collaborative manipulator controller received in the cavity configured to be operably coupled to the collaborative manipulator to actuate the collaborative manipulator in accordance with a control scheme, the platform assembly including a safety controller received in the cavity, the safety controller being electrically coupled to the battery of the AGV to control a power supply to the collaborative manipulator controller, wherein the safety controller includes a safety controller box separate and discrete from the walls of the frame, the safety controller box having a chamber, the safety controller box being located in the cavity and surrounded by the walls of the frame such that the safety controller box is enclosed by the frame and inaccessible in the cavity through the walls, the safety controller including a safety relay in the chamber enclosed by the safety controller box and coupled to the power supply and configured to open and close a circuit, the safety controller including a circuit breaker in the chamber enclosed by the safety controller box and coupled to the power supply, the safety controller including a wireless communication module in the chamber enclosed by the safety controller box and coupled to the safety relay and communicatively coupled to a system control module, the system control module having a controller to control operation of the collaborative manipulator controller, and
   wherein the platform assembly includes a tray slidably coupled to the frame to move the tray into and out of the cavity in a linear sliding direction, the safety controller being mounted to the tray to slide into and out of the cavity with the tray, the tray moving the safety controller into and out of the cavity with the tray to access the components of the safety controller when the tray is slid out of the cavity, the platform assembly including a door closing the cavity to enclose the tray in the cavity when the door is closed to restrict access to the components of the safety controller when the door is closed, wherein the tray is movable out of the cavity when the door is open.

2. The autonomous mobile vehicle of claim 1, wherein the safety relay is configured to open and close a circuit to allow the power supply to the collaborative manipulator controller when operating in a normal operation mode and to restrict the power supply from the collaborative manipulator controller when operating in a safe operation mode.

3. The autonomous mobile vehicle of claim 1, wherein the wireless communication module having an antenna receiving control signals, the wireless communication module being operably coupled to the safety relay of the safety controller to control operation of the safety controller.

4. The autonomous mobile vehicle of claim 1, wherein the safety controller includes a first power converter and a second power converter, the first power converter operably coupled to a first collaborative manipulator component, the second power converter operably coupled to a second collaborative manipulator component, the first power converter supplying the power supply at a first voltage, the second power converter supplying the power supply at a second voltage different from the first voltage.

5. The autonomous mobile vehicle of claim 1, wherein the door is coupled to the walls and being opened to provide access to the tray and allow the tray to slide out of the cavity.

6. The autonomous mobile vehicle of claim 1, wherein the frame of the platform assembly includes a remote control device mounting bracket, the platform assembly further comprising a remote control device removably received in the remote control device mounting bracket, the remote control device having a controller in a housing, the controller being communicatively coupled to at least one of the AGV controller, the collaborative manipulator controller, and the safety controller, the remote control device having a user interface configured to receive user inputs to control operation of at least one of the AGV controller, the collaborative manipulator controller, and the safety controller.

7. The autonomous mobile vehicle of claim 1, wherein the frame of the platform assembly supports a teach pendant on an exterior of the frame, the teach pendant being communicatively coupled to the collaborative manipulator controller.

8. The autonomous mobile vehicle of claim 1, wherein the support plate includes first mounting elements at a first mounting location and second mounting elements at a second mounting location, the first and second mounting locations at a top of the support plate, the first mounting area configured to receive a first type of collaborative manipulator, the second mounting area being configured to receive a second type of collaborative manipulator.

9. The autonomous mobile vehicle of claim 1, further comprising a collaborative manipulator mounted to the support plate, the collaborative manipulator configured to manipulate parts and move the parts to and from the support plate.

10. An autonomous mobile arm platform for an automatic guided vehicle (AGV) having a base, a motor coupled to the base, a wheel driven by the motor for moving the AGV, a battery coupled to the motor to power the motor, and an AGV controller for controlling movement of the AGV, the autonomous mobile arm platform comprising:
- a frame configured to be coupled to the base of the AGV and moved with the AGV, the frame having side walls between a top and a bottom of the frame, the side walls enclosing and defining a cavity;
- a support plate at the top of the frame, the support plate configured to support a collaborative manipulator;
- a collaborative manipulator controller received in the cavity configured to be operably coupled to the collaborative manipulator to actuate the collaborative manipulator in accordance with a control scheme;
- a safety controller received in the cavity configured to be electrically coupled to the battery of the AGV to control a power supply to the collaborative manipulator controller, the safety controller includes a safety controller box having a chamber, the safety controller box separate and discrete from the frame and being located in the cavity and surrounded by the side walls of the frame such that the safety controller box is enclosed by the frame and inaccessible in the cavity through the walls, the safety controller including a power converter for converting from a voltage level of the battery to a desired voltage level, the power converter located in the chamber enclosed by the safety controller box, the safety controller including a safety relay operably coupled to the power converter, the safety relay located in the chamber enclosed by the safety controller box, the safety relay configured to open and close a circuit supplying power to the power converter, the safety relay operable in a normal operation mode and in a safe operation mode, the safety relay supplying the power supply to the collaborative manipulator controller when operating in the normal operation mode, the safety relay restricting the power supply from the collaborative manipulator controller when operating in a safe operation mode.

11. The autonomous mobile arm platform of claim 10, wherein the safety controller includes a wireless communication module having an antenna receiving control signals, the wireless communication module being operably coupled to the safety relay of the safety controller to control operation of the safety controller.

12. The autonomous mobile arm platform of claim 10, wherein the power converter of the safety controller includes a first power converter and a second power converter, the first power converter operably coupled to a first collaborative manipulator component, the second power converter operably coupled to a second collaborative manipulator component, the first power converter supplying the power supply at a first voltage, the second power converter supplying the power supply at a second voltage different from the first voltage.

13. The autonomous mobile arm platform of claim 10, wherein the safety controller including a circuit breaker in the chamber coupled to the power supply, the safety controller including a wireless communication module having an antenna, the wireless communication module received in the chamber coupled to the safety relay and communicatively coupled to a system control module to control operation of the collaborative manipulator controller.

14. The autonomous mobile arm platform of claim 10, wherein the platform assembly includes a tray slidably coupled to the frame, at least one of the collaborative manipulator controller and the safety controller being mounted to the tray to slide into and out of the cavity with the tray.

15. The autonomous mobile arm platform of claim 10, wherein the support plate includes first mounting elements at a first mounting location and second mounting elements at a second mounting location, the first and second mounting locations at a top of the support plate, the first mounting elements at the first mounting location configured to receive a first type of collaborative manipulator, the second mounting elements at the second mounting location being configured to receive a second type of collaborative manipulator.

16. An autonomous mobile vehicle comprising:
- an automatic guided vehicle (AGV) having a base, a motor coupled to the base, a wheel driven by the motor for moving the AGV, a battery coupled to the motor to power the motor, and an AGV controller for controlling movement of the AGV;
- a platform assembly coupled to the base of the AGV and moved with the AGV, the platform assembly including a frame having walls enclosing and defining a cavity, the platform assembly including a support plate supported by the frame, the support plate including first mounting elements at a first mounting location and second mounting elements at a second mounting location, the first and second mounting locations at a top of the support plate, the platform assembly including a collaborative manipulator controller received in the cavity being electrically coupled to the battery of the AGV, the platform assembly including a safety controller received in the cavity, the safety controller being electrically coupled to the battery of the AGV to control a power supply, wherein the safety controller includes a safety controller box separate and discrete from the walls of the frame, the safety controller box having a chamber, the safety controller box being located in the cavity and surrounded by the walls of the frame such that the safety controller box is enclosed by the frame and inaccessible in the cavity through the walls, the safety controller including a safety relay in the chamber enclosed by the safety controller box and coupled to the power supply and configured to open and close a circuit, the safety controller including a circuit breaker in the chamber enclosed by the safety controller box and coupled to the power supply, the safety controller including a wireless communication module in the chamber enclosed by the safety controller box and coupled to the safety relay and communicatively coupled to a system control module, the system control module having a controller to control operation of the collaborative manipulator controller; and
- a collaborative manipulator configured to be mounted to the support plate at the first mounting location to orient the collaborative manipulator in a first orientation relative to the platform assembly and configured to be mounted to the support plate at the second mounting location to orient the collaborative manipulator in a second orientation relative to the platform assembly, the second orientation being different than the first orientation, the collaborative manipulator configured to manipulate parts and move the parts to and from the support plate.

17. The autonomous mobile vehicle of claim 16, wherein the support plate includes a first mounting hole pattern at the first mounting location and the support plate has a second mounting hole pattern at the second mounting location different than the first mounting hole pattern.

18. The autonomous mobile vehicle of claim 16, wherein the support plate includes a first wire opening at the first mounting area configured to receive a power wire for supplying power to the collaborative manipulator in the first orientation, and wherein the support plate includes a second wire opening at the second mounting area configured to receive a power wire for supplying power to the collaborative manipulator in the second orientation.

19. The autonomous mobile vehicle of claim 16, wherein the second mounting area is configured to receive a different type of collaborative manipulator than the first mounting area.

20. An autonomous mobile vehicle system comprising:
a first machine at a first location having first parts;
a second machine at a second location having second parts;
a plurality of autonomous mobile vehicles movable between the first machine and the second machine, each autonomous mobile vehicle comprising an AGV, a platform assembly mounted to the AGV, and a collaborative manipulator mounted to the platform assembly, the AGV including a base, a motor coupled to the base, a wheel driven by the motor for moving the AGV, a battery coupled to the motor to power the motor, and an AGV controller for controlling movement of the AGV, the platform assembly being movable with the AGV, the platform assembly including a frame having walls enclosing and defining a cavity, the platform assembly including a support plate supported by the frame, the collaborative manipulator being mounted to the support plate, the platform assembly including a collaborative manipulator controller received in the cavity operably coupled to the collaborative manipulator to actuate the collaborative manipulator in accordance with a control scheme, the platform assembly including a safety controller received in the cavity, the safety controller being electrically coupled to the battery of the AGV to control a power supply to the collaborative manipulator controller, wherein the safety controller includes a safety controller box separate and discrete from the frame and received in the cavity, the safety controller box being surrounded by the side walls of the frame such that the safety controller box is enclosed by the frame and inaccessible in the cavity through the walls, the safety controller box enclosed by the frame, the safety controller box having a chamber, the safety controller including a power converter in the chamber enclosed by the safety controller box and for converting from a voltage level of the battery to a desired voltage level, the safety controller including a safety relay in the chamber enclosed by the safety controller box and coupled to the power supply and operably coupled to the power converter, the safety relay configured to open and close a circuit supplying power to the power converter, the safety controller including a circuit breaker in the chamber enclosed by the safety controller box and coupled to the power supply, the safety controller including a wireless communication module in the chamber enclosed by the safety controller box and coupled to the safety relay, the system control module having a controller to control operation of the collaborative manipulator controller; and
a system control module for guiding the autonomous mobile vehicles within an environment between the first machine and the second machine, the system control module having a controller, the system control module includes a control communication module communicatively coupled to the first machine and the second machine, the control communication module being communicatively coupled to the autonomous mobile vehicles to guide the autonomous mobile vehicles between the first machine and the second machine, the system control module including a human machine interface communicatively coupled to the control communication module to receive inputs from an operator.

21. The autonomous mobile vehicle system of claim 20, wherein the first machine and the second machine are coupled to the control communication module by wired connections, the control communication module is communicatively coupled to wireless communication modules of the autonomous mobile vehicles by wireless connections.

22. The autonomous mobile vehicle system of claim 20, wherein the first machine sends a request signal to the system control module when the first parts are available for pick up, the system control module transmits a navigation signal to a selected autonomous mobile vehicle of the autonomous mobile vehicles to navigate to the first machine and pick up the first parts using the collaborative manipulator of the selected autonomous mobile vehicle and to navigate the selected autonomous mobile vehicle to a drop off location, the selected autonomous mobile vehicle sends a delivery signal to the system control module when the first parts are delivered, the system control module sends an acknowledgement signal to the first machine acknowledging deliver of the first parts to the drop off location.

23. The autonomous mobile vehicle system of claim 20, wherein the platform assembly includes a tray slidably coupled to the frame, at least one of the collaborative manipulator controller and the safety controller being mounted to the tray to slide into and out of the cavity with the tray.

* * * * *